United States Patent [19]
Andis

[11] 3,754,574
[45] Aug. 28, 1973

[54] HYDRAULICALLY-ACTUATED OMNI-DIRECTIONAL FLUID VALVE

[76] Inventor: Allen Richard Andis, 3209 Elwood Dr., Racine, Wis. 53405

[22] Filed: June 19, 1972

[21] Appl. No.: 264,238

[52] U.S. Cl............................. 137/625.66, 137/625.23
[51] Int. Cl............................................... F16k 11/02
[58] Field of Search................... 137/625.21, 625.46, 137/625.66, 625.43, 625.23, 625.47; 251/3, 315, 174, 315, 335

[56] References Cited
UNITED STATES PATENTS
| | | | |
|---|---|---|---|
| 2,698,731 | 1/1955 | Koehler et al. | 137/625.47 X |
| 3,495,624 | 2/1970 | Kling | 137/625.47 UX |
| 3,628,570 | 12/1971 | Andis | 137/625.23 |

Primary Examiner—Henry T. Klinksiek
Assistant Examiner—Robert J. Miller
Attorney—Axel H. Johnson

[57] ABSTRACT

A valve comprising two discrete hydraulic systems in one body; the first system being employed to actuate the valve, the second system being employed to perform the work function. A spherical control member, having passageways and a truncation, is nutated in the body by hydraulically-actuated plungers that engage the truncation to rotate the control member and to selectively direct fluid through the passageways and perform the work.

3 Claims, 12 Drawing Figures

HYDRAULICALLY-ACTUATED OMNI-DIRECTIONAL FLUID VALVE

BACKGROUND OF THE INVENTION

1. Field of the Invention

This invention concerns a hydraulic valve having a plurality of independent hydraulic systems: One of these systems being employed to actuate the valve so as to control the other system.

2. Description of the Prior Art

The prior art comprises a manually-operated valve of a type having a nutating control member such as disclosed in the patent to Andis U.S. Pat. No. 3,628,570 for an OMNI-DIRECTIONAL FLUID-CONTROL VALVE.

SUMMARY OF THE INVENTION

This invention is an improvement of the valve which is the subject matter of U.S. Pat. No. 3,628,570. The control member of the present valve is of a spherical contour and is substantially surrounded by a body portion, and having freedom to nutate therein. This control member is provided with a truncation defining a plane that co-operates with plungers which are hydraulically actuated to nutate the control member relative to its seat in the body portion of the valve.

The plungers are made a free fit in the body so that a "leak by" condition exists, yet enough pressure remains to force the plunger axially against the truncation and nutate the control member. The fluid that fills the chamber defined by the truncation then "leaks by" the periphery of the opposed plunger and returns to a suitable sump. When the pressure that actuates the plunger is interrupted, the compressed spring of the opposed plunger tends to return the control member to a neutral position. An object of this invention is to provide a remote hydraulic control for a hydraulic valve.

Further objects and advantages of this invention will become apparent from a consideration of the following detailed description. It is, however, to be understood that the invention is not to be limited to the details disclosed, but includes all such variations as fall within the spirit of the invention.

Referring to the drawings.

Figure 1:
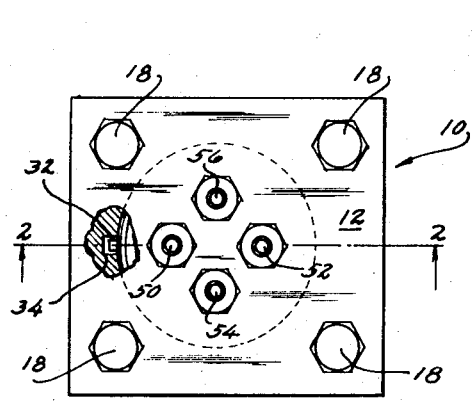
FIG. 1 is a top view of a typical valve involving this invention.
Figure 4:
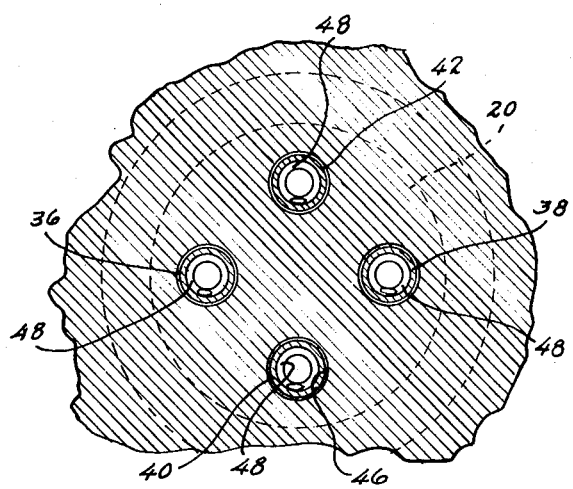
FIG. 4 is an enlarged section taken at 4—4 of FIG. 2.

A typical valve embracing this invention comprises a body 10 composed of an upper portion 12 and a lower portion 14, provided with mutual close-fitting surfaces as at 16. Cap screws 18 pass through portion 12 and are threaded into portion 14 in order to secure portions 12 and 14 together, and provide a leak-proof assembly at the surfaces indicated at 16.

The control member 20 comprises a sphere, preferably of metal, and having a central point 22. Control member 20 is accurately seated for rotation in a corresponding seat in body portions 12 and 14 so that a fluid seal is created between the member and the seat. Member 20 is, however, free to rotate relative to the seat. A circumferentially-open primary passageway 24 extends about the periphery of the member 20 and is symmetrical with the central point 22. A plurality of circumferentially-positioned secondary passageways 26, 4 in this instance, are provided at 90 degree positions about the periphery of member 20 and in planes tangent to passageway 24. A lower passageway 28 is provided at the bottom of spherical member 20, defined by a plane parallel to the passageway 24. Member 20 is truncated as at 30 to provide a cam surface. Truncation 30 is spaced from passageway 24 and in a plane parallel thereto. A pin 32 is provided integrally with the member 20 with the axis thereof lying in a plane passing through the center point 22 of the spherical control member 20. Pin 32 is confined to movement in a keyway 34 provided in portions 12 and 14, for the purpose of confining the rotation of member 20 within the desired limits.

Figure 2:
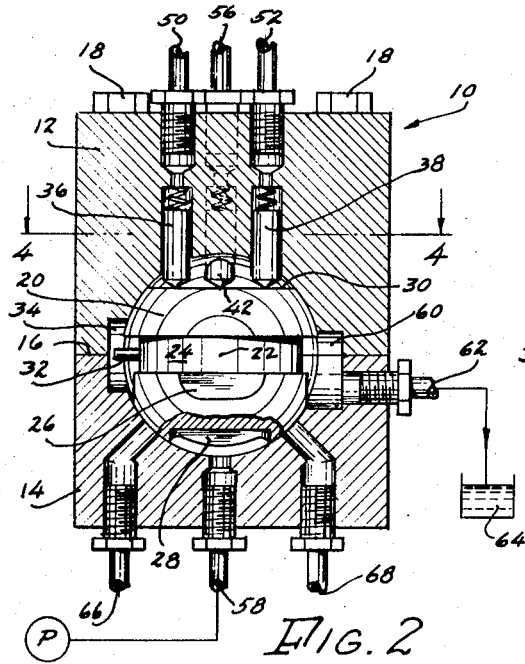
FIG. 2 is a section taken at 2—2 of FIG. 1.
Figure 5:
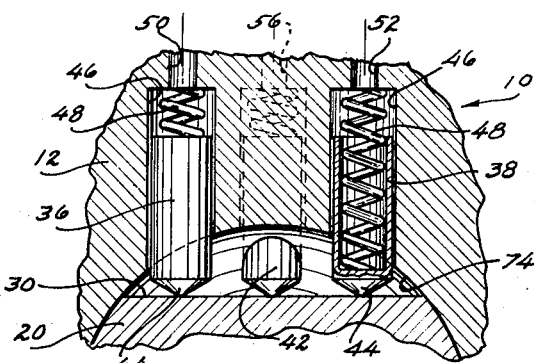
FIG. 5 is an enlarged view of a portion of FIG. 2.
Figure 6:
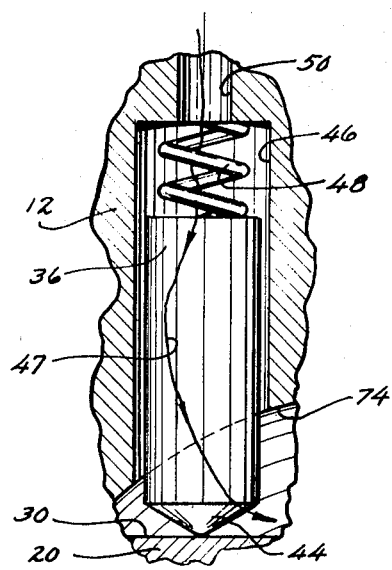
FIG. 6 is a further enlargement of a portion of FIG. 5.

In order to actuate the valve, a plurality of cylindrical plungers 36, 38, and 40, 42 are positioned in "pair" relationship in portion 12 as shown. These plungers are tubular and terminate in conic ends 44 which make contact with the surface of the truncation 30. Plungers 36, 38, 40 and 42 are axially slidable in bores such as 46. Bores 46 are of a size that will permit a portion of the hydraulic fluid to "leak by" the periphery of plungers 36, 38, 40 and 42 as indicated at 47 of FIG. 6. Spring members such as 48 extend axially in the bores of the plungers, and are of a length to engage the bottom of the tubular portions of the plungers and the upper end of the bores 46 when the truncation 30 is in a horizontal or neutral position, as shown in FIGS. 2 and 5. In this position the springs 48 are in mutually-balanced compression so as to retain the member 20 in the neutral position.

Figure 7:
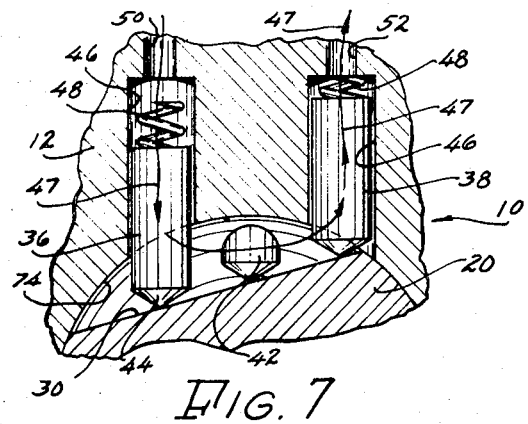
FIG. 7 is a section similar to FIG. 5, but showing the valve during nutation of the control member.
Figure 8:
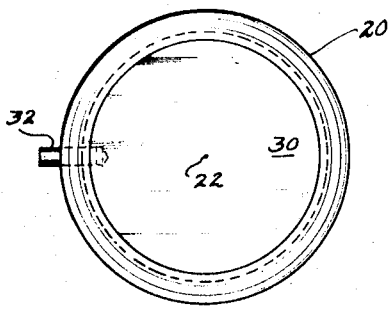
FIG. 8 is a top view of the control member normal to the truncation.
Figure 9:
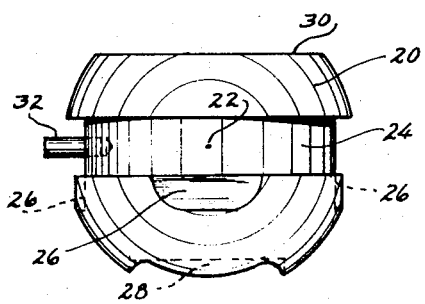
FIG. 9 is a side view of the control member.
Figure 10:
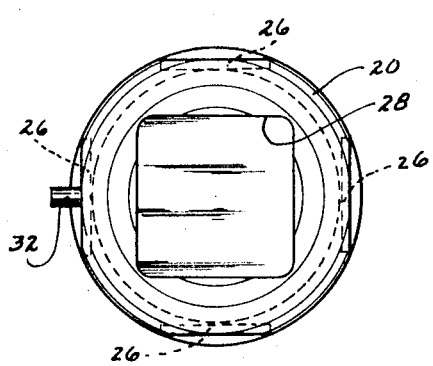
FIG. 10 is a bottom view of the control member.

Plungers 36, 38 40 and 42 are hydraulically actuated by fluid through conduits 50, 52, 54 and 56. While four identical plungers are involved, it is sufficient to confine the description thereof to the pair of plungers 36, 38, as the operation of plungers 40 and 42 are identical thereto. They operate in pairs; for example, one actuating system involves plungers 36 and 38 as shown in FIG. 7, and an other system involves plungers 40 and 42, and at right angles thereto. It is assumed that the systems involving conduits 50, 52, 54 and 56 comprise a hydraulic supply under pressure, and a sump.

FIG. 2 shows the control member 20 in a neutral position. A fluid inlet conduit 58 conveys the fluid under pressure from the pump P.

Figure 11:
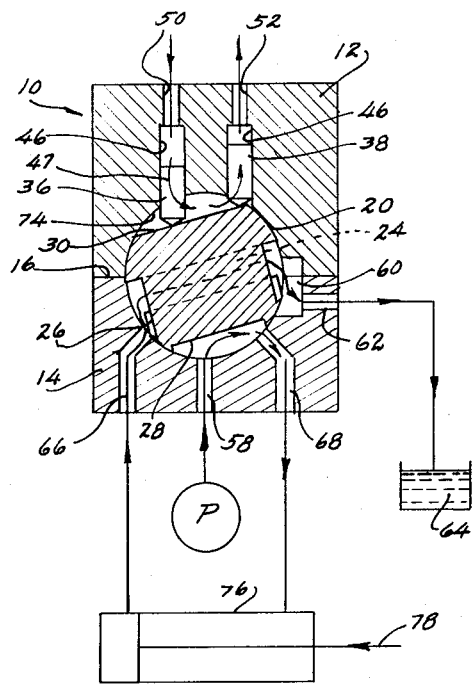
FIGS. 11 and 12 are diagrammatic views of two positions of the valve during actuation of the systems.

Body 10 has provided therein a cavity 60 that communicates with passageway 24. A fluid outlet 62 conveys fluid to sump 64. One work circuit operates in conjunction with conduits 50 and 52, as shown in FIG. 11, and comprises conduits 66 and 68. The other "work" circuit operates in conjunction with conduits 54 and 56 an comprises conduits 70 and 72. However, the circuit related to conduits 50 and 52 only, will be described, as both circuits are identical.

Referring to FIG. 11, hydraulic fluid under pressure enters conduit 50, forcing plunger 36 axially so as to nutate control member 20. A portion of the fluid "leaks by" the plunger 36, peripherally thereof, and enters the chamber 74. Fluid under pressure in the chamber then "leaks by" the periphery of plunger 38 and escapes through conduit 52. A proportionate amount of fluid also "leaks by" plungers 40 and 42. The position taken by the control member 20 permits fluid from pump P to flow through conduit 58 into passageway 28 and out conduit 68 to the double-acting cylinder or ram 76 to move the piston thereof in the direction of the arrow 78, forcing fluid to flow through conduit 66, to enter passageway 26 and 24, and outlet 62 to sump 64.

Figure 12:
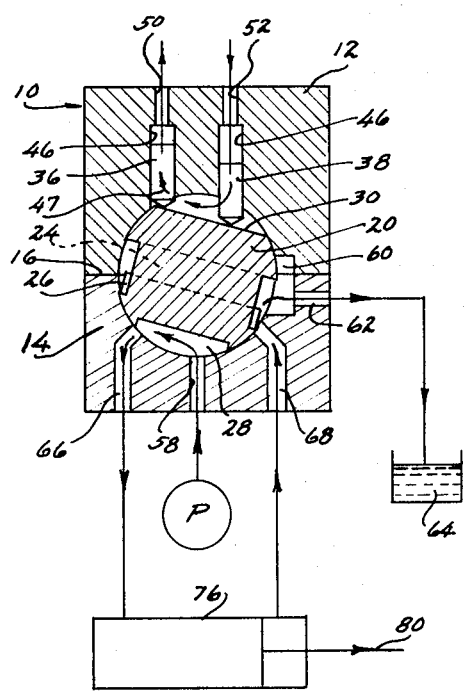

Referring to FIG. 12, hydraulic fluid under pressure enters conduit 52, forcing plunger 38 axially so as to nutate control member 20. A portion of the fluid "leaks by" the plunger 38 and peripherally thereof, and enters the chamber 74. Fluid under pressure then "leaks by" the periphery of plunger 36 and escapes through conduit 50. The position taken by the control member 20 permits fluid from pump P to flow through conduit 58, into passageway 28 and out through conduit 66 to the double-acting cylinder or ram 76 to move the piston thereof in the direction of the arrow 80, forcing fluid to flow through conduit 68, to enter passageway 26 and cavity 60, and then through outlet 62 to sump 64.

Figure 3:
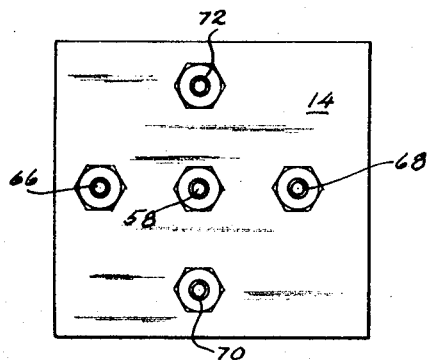
FIG. 3 is a bottom view, looking upwardly.

It is to be understood that a double-acting ram such as 76 can also be made part of a second system and connected to conduits 70 and 72 indicated in FIG. 3, and controlled in a similar manner by means of plungers 40 and 42. These plungers and conduits lie in a plane at right angles to the plane of plungers 36 and 38 and conduits 66 and 68. Thus two cylinders such as 76, or other suitable hydraulic units can be selectively controlled by one valve 10.

The above being a complete description of an illustrative embodiment of the invention, what is claimed as new and desired to be secured by Letters Patent of the United States is:

1. A fluid-controlled valve having a first hydraulic system and a second hydraulic system, said systems being hydraulically discrete, said first system being an actuating system, and said second system being a work system; said valve comprising a body, a spherical control member nutatable in a spherical seat in said body, and having a truncation defining a fluid chamber, said first system comprising a plurality of plungers in pair-relationship, and being axially slidable in said body in bores of a diameter in excess of the diameter of said plungers, fluid conduits directed to said bores, resilient means in said bores urging said plungers into engagement with said truncation, said first system adapted to supply fluid under pressure through one of said conduits to axially shift the plunger in said bore to nutate said control member, a proportionate amount of said fluid flowing peripherally about said plunger and filling said chamber during said nutation, a proportionate amount of said fluid flowing about the periphery of said other plunger of said pair and escaping through the conduit connected thereto, a primary peripherally-open passageway encircling the surface of said member parallel to the plane of said truncation, a plurality of discrete peripherally-spaced secondary passageways on said member opening into said primary passageway and directed downwardly therefrom, a lower passageway on the surface of said control member, centrally positioned relative to said truncation and discrete from said secondary passageways, said second system comprising a plurality of work conduits in pair relationship, and an outlet port, said work conduits comprising a central inlet conduit directing fluid to said lower passageway, to be confined therein when said plungers are inactive, said fluid being directed to flow through one of said work conduits from said lower passageway upon nutation of said control member in one direction, and directed to flow through the other of said work conduits upon nutation of said control member in the other direction, said fluid during said flow into the respective conduits, escapes from the other conduit to flow into the respective secondary passageway and about the peripherally-open passageway to escape through said outlet port.

2. A fluid-controlled valve as set forth in claim 1, wherein said first system comprises a plurality of pairs of plungers lying in angularly-positioned planes having one pair of said plungers in each plane.

3. A fluid valve as set forth in claim 1, wherein said work conduits comprise a plurality of pairs of conduits lying in angularly-positioned planes having one of said pairs in each of said planes.

* * * * *